(12) United States Patent
Krane et al.

(10) Patent No.: US 9,285,972 B2
(45) Date of Patent: Mar. 15, 2016

(54) SIZE ADJUSTMENT CONTROL FOR USER INTERFACE ELEMENTS

(71) Applicants: Rolf Krane, Weisloch (DE); Tobias Gollwitzer, Heidelberg (DE); Michael Krenkler, Weisloch (DE)

(72) Inventors: Rolf Krane, Weisloch (DE); Tobias Gollwitzer, Heidelberg (DE); Michael Krenkler, Weisloch (DE)

(73) Assignee: SAP SE, Walldorf (DE)

( * ) Notice: Subject to any disclaimer, the term of this patent is extended or adjusted under 35 U.S.C. 154(b) by 152 days.

(21) Appl. No.: 13/719,165

(22) Filed: Dec. 18, 2012

(65) Prior Publication Data

US 2014/0173478 A1 Jun. 19, 2014

(51) Int. Cl.
*G06F 3/0488* (2013.01)
*G06F 3/0484* (2013.01)

(52) U.S. Cl.
CPC ........ *G06F 3/04847* (2013.01); *G06F 3/04845* (2013.01); *G06F 3/0488* (2013.01)

(58) Field of Classification Search
CPC  G06F 3/04847; G06F 3/04845; G06F 3/0488
USPC ....................................................... 715/765
See application file for complete search history.

(56) References Cited

U.S. PATENT DOCUMENTS

| | | | | |
|---|---|---|---|---|
| 8,407,606 | B1* | 3/2013 | Davidson | G06F 3/0488 345/173 |
| 2003/0076301 | A1* | 4/2003 | Tsuk | G06F 1/1626 345/159 |
| 2007/0152984 | A1* | 7/2007 | Ording | G06F 3/04845 345/173 |
| 2010/0229088 | A1* | 9/2010 | Nakajima et al. | 715/702 |
| 2011/0029917 | A1* | 2/2011 | Um | 715/800 |
| 2011/0083112 | A1* | 4/2011 | Matsubara et al. | 715/863 |
| 2011/0102464 | A1* | 5/2011 | Godavari | 345/650 |
| 2012/0327126 | A1* | 12/2012 | Solismaa et al. | 345/661 |
| 2014/0164198 | A1* | 6/2014 | Caldwell | G06Q 40/00 705/35 |
| 2014/0236789 | A1* | 8/2014 | Caldwell | G06Q 40/02 705/35 |

OTHER PUBLICATIONS

IBM, "Mechanism for the adaptive value calculation of the knob widget/control", Published by ip.com, IP.com No. 000189145.*

* cited by examiner

*Primary Examiner* — Ajay Bhatia
*Assistant Examiner* — Justin R Blaufeld
(74) *Attorney, Agent, or Firm* — Mintz Levin Cohn Ferris Glovsky and Popeo, P.C.

(57) ABSTRACT

A knob element associated with a user interface element in a graphical user interface can be translated in response to a rotational user input motion. As the knob element is translated around the user interface element, a change in the size of the user interface element can occur that is at least in part based on amount of rotational distance.

14 Claims, 21 Drawing Sheets

SIZE ADJUSTMENT CONTROL FOR USER INTERFACE ELEMENTS

TECHNICAL FIELD

The subject matter described herein relates to a control for adjusting the size of user interface elements, for example those displayed in a graphical user interface.

BACKGROUND

Changing the size of a graphical object on a graphical user interface using a user input device, such as for example a touch screen (e.g. a screen that displays one or more graphical user interface elements and that receives user input via a touch of the screen by one or more user fingers, a stylus, or other device for contacting the screen surface), pointer controller device (e.g. a mouse, trackball, trackpad, or the like), etc. can be difficult, particularly in cases in which the object is relatively small in size. For example, in a typical drawing program (e.g. PowerPoint™ or Visio™ available from Microsoft Corporation of Redmond, Wash., other program involving graphical user interface features than can be manipulated by a user, or the like), it can be quite difficult for a user to select and vary a size of a very small element, in particular if the small element overlaps or is closely adjacent to other elements. Some graphical user interface programs allow sizing operations that can involve a "pinch" or "spread" operation for resizing of an object or other element. However, such operations can typically require an additional gesture or entry via a text box or other input control to achieve precise size control.

SUMMARY

In one aspect, a method includes detecting a selection of a user interface element within a graphical user interface, displaying a knob element associated with the user interface element in the graphical user interface, receiving a rotational motion second user input associated with the knob element, translating the knob element around the selected user interface element over a unit of rotational distance, and changing a size of the selected user interface element based on the unit of rotational distance. The selection occurs via a first user input.

In some variations one or more of the following can optionally be included in any feasible combination. The changing of the size of the selected user interface element can be directly proportional to the unit of rotational distance. The changing of the size of the selected user interface element can be variable with the unit of rotational distance. An algorithm can be applied to determine an amount of the changing of the size of the selected user interface element as a function of the unit of rotational distance. Such an algorithm can use as an additional input a current size of the selected user interface element. The changing of the size of the selected user interface element can include an increase in the size when the unit of rotational distance is in a clockwise direction around the selected user interface element and a decrease in the size when the unit of rotational distance is in a counter-clockwise direction around the selected user interface element.

Implementations of the current subject matter can include, but are not limited to, systems and methods including one or more features as described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

As noted above, fine adjustments to a size of a user interface element can present difficulties using currently available approaches. Implementations of the current subject matter can include user interface functionality in which a "knob" element is displayed near a perimeter, outer border, or the like of a selected user interface element. As described herein, the term "associated with" is used to refer to a relationship between such a knob element and a selected user interface element. The knob element and selected user interface element need not overlap or be connected or otherwise in contact on as seen on a display showing a screen of the user interface.

For example, the knob element can be displayed such that at least part of it overlaps or otherwise contacts the selected user interface element. Alternatively, the knob element can be displayed proximate or otherwise adjacent to the selected user interface element.

FIG. 1 through FIG. 14 show a series of screenshots 100, 200, 300, 400, 500, 600, 700, 800, 900, 1000, 1100, 1200, 1300, 1400 illustrating use of a knob element 204 for increasing a size of a user interface element 104. FIG. 15 through FIG. 19 show a series of screenshots 1500, 1600, 1700, 1800, 1900 illustrating use of a knob element 204 for decreasing a size of another user interface element 102. The series of screenshots 100-1900 shows features of a graphical user interface of a program for analyzing sales pipeline data. A given sales opportunity can be represented by a circular graphical element, which a user can manipulate by moving it along a Y-(vertical) axis to reflect a probability of success, by moving it along a X-(horizontal) axis to reflect an expected time that the opportunity can be realized, and by changing its size to reflect a magnitude of the opportunity relative to other opportunities. While this example is provided to illustrate features that may be included in one or more implementations of the current subject matter, it will be understood that none of the features described are intended to be limiting. Features consistent with or otherwise similar to those described herein can be useful in a wide variety of graphical user interface applications in which a user can change a size of a graphical element of any shape.

Figure 1:
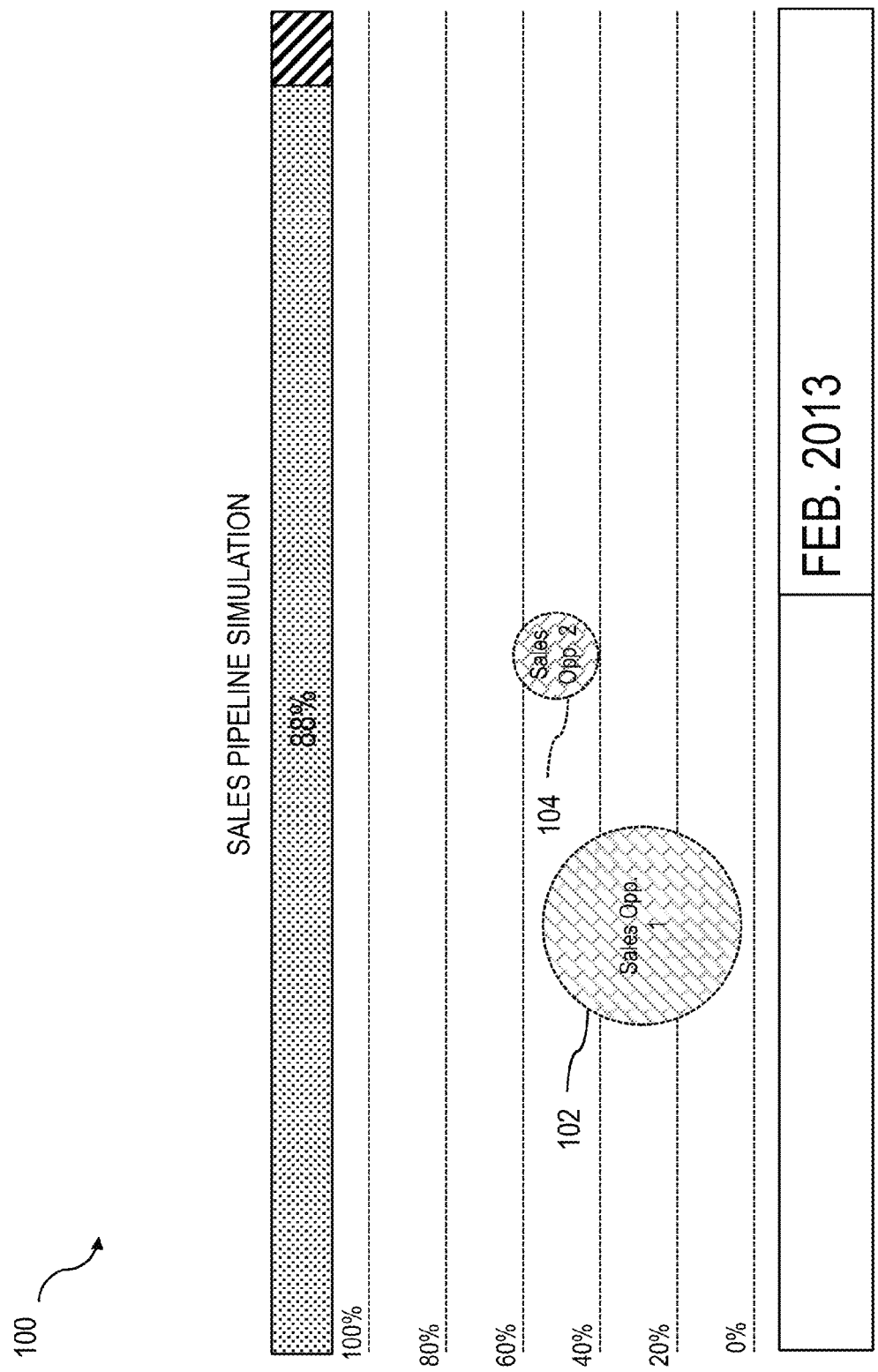
FIG. 1 through FIG. 14 show a series of screenshots of a user interface displaying features relating to increasing a size of a user interface element consistent with implementations of the current subject matter.
Figure 2:
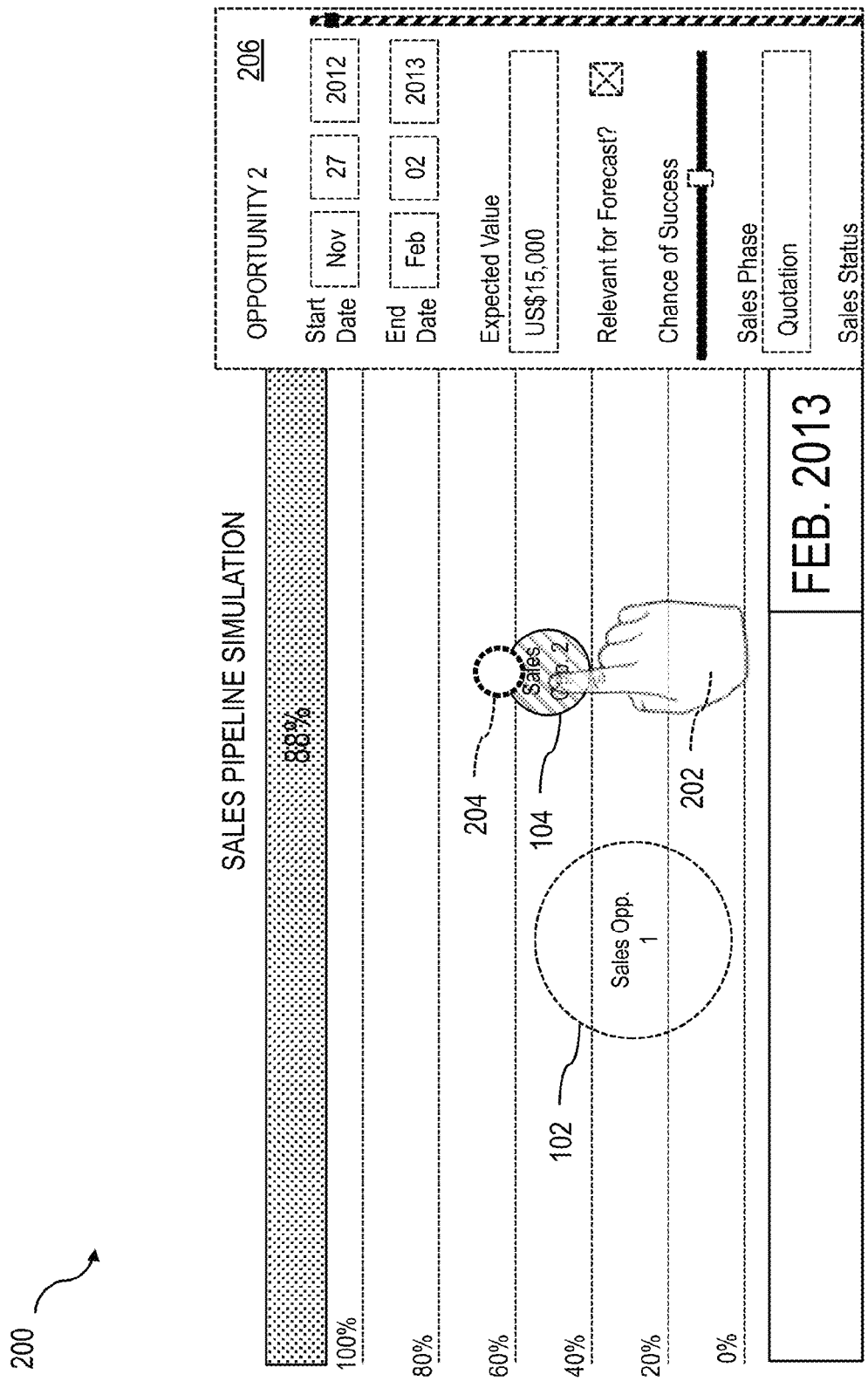
Figure 3:
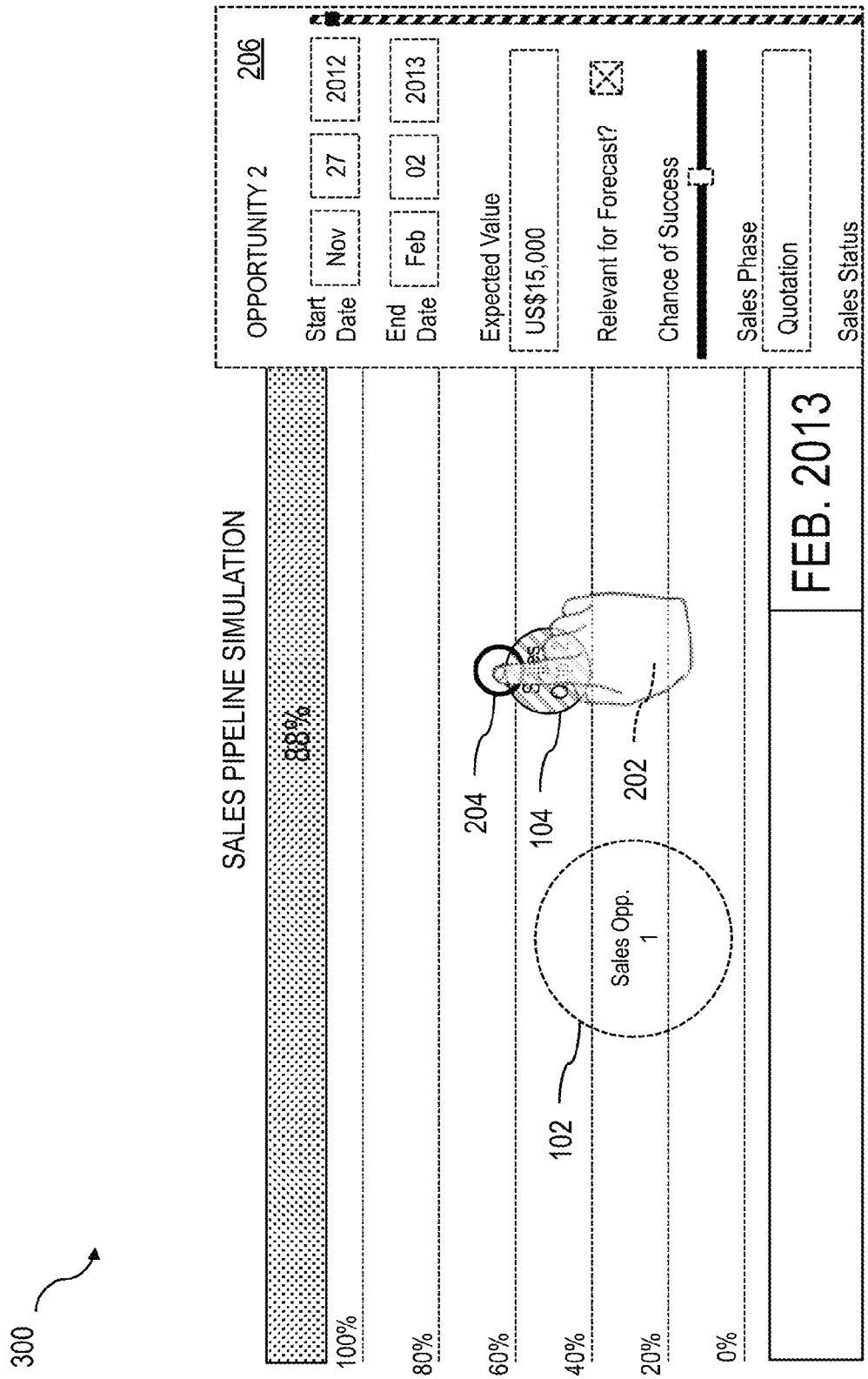
Figure 4:
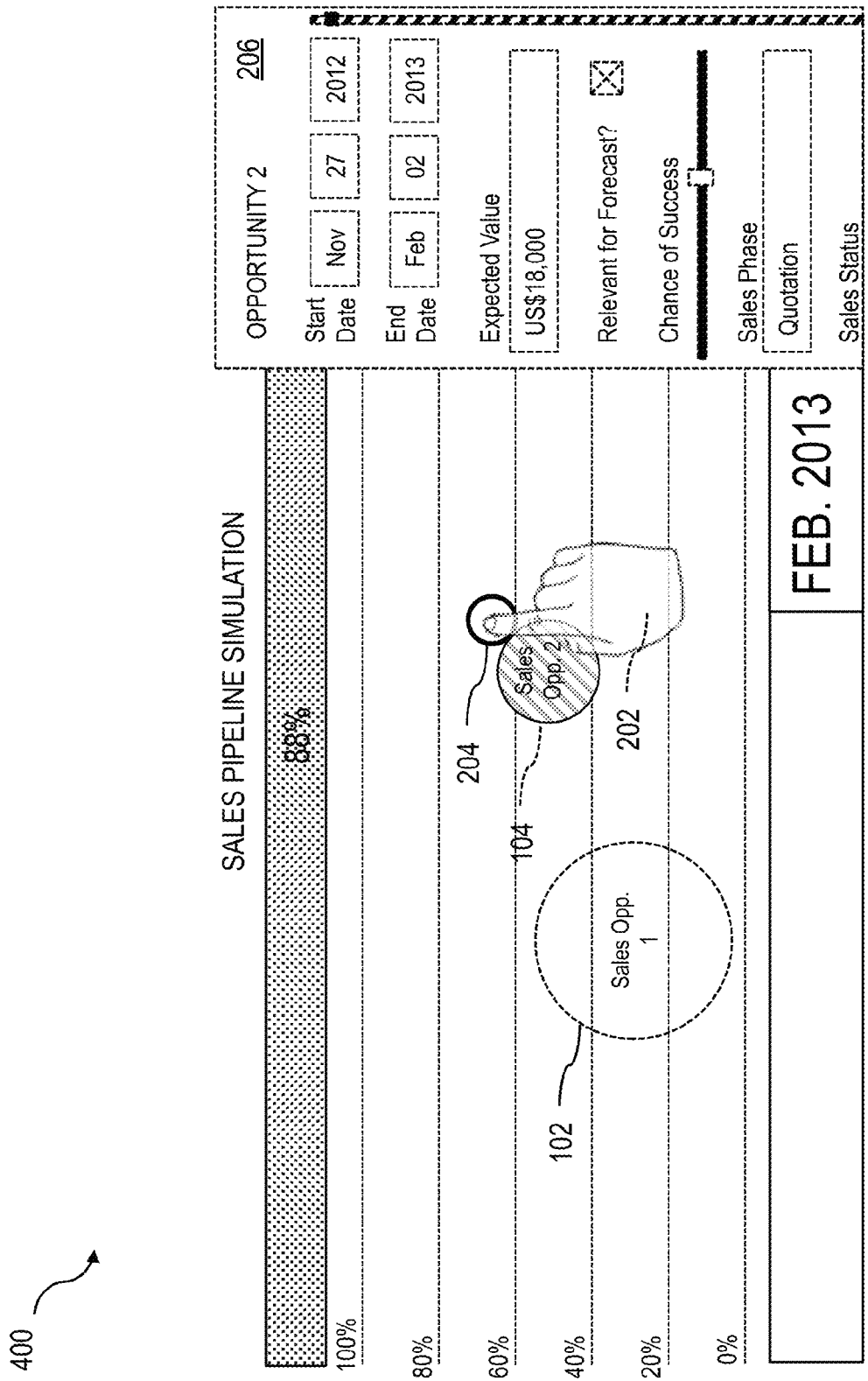
Figure 5:
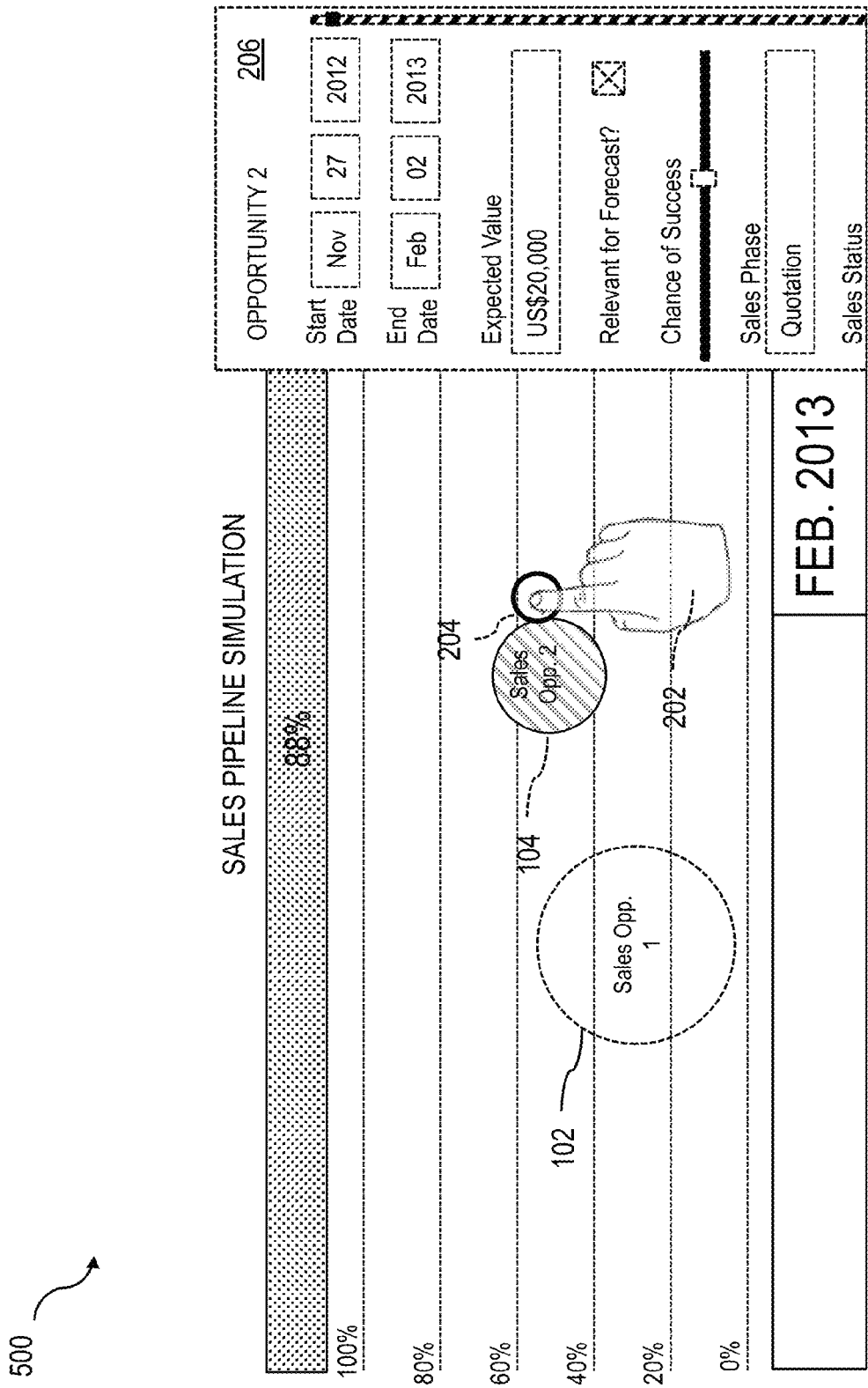
Figure 6:
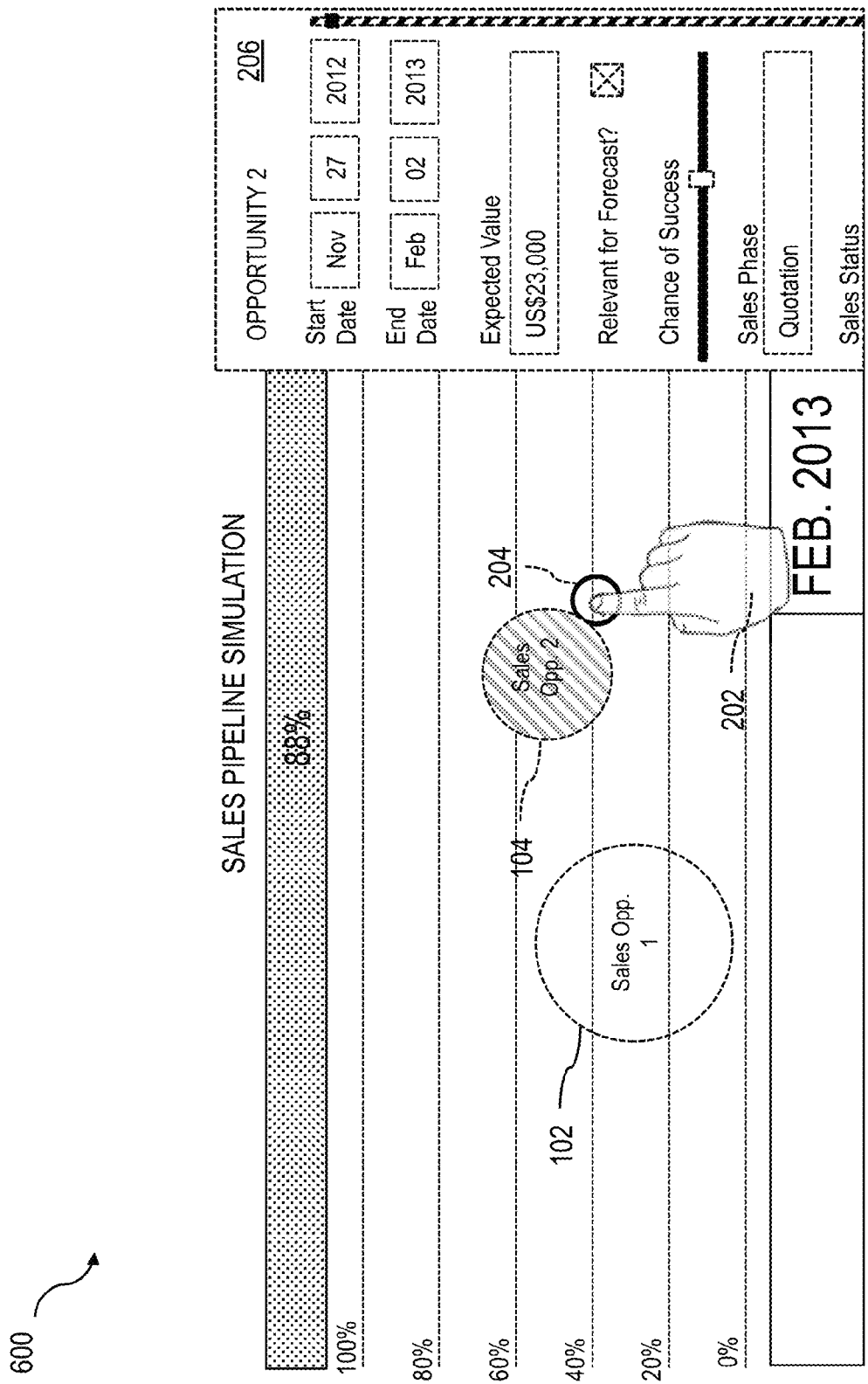
Figure 7:
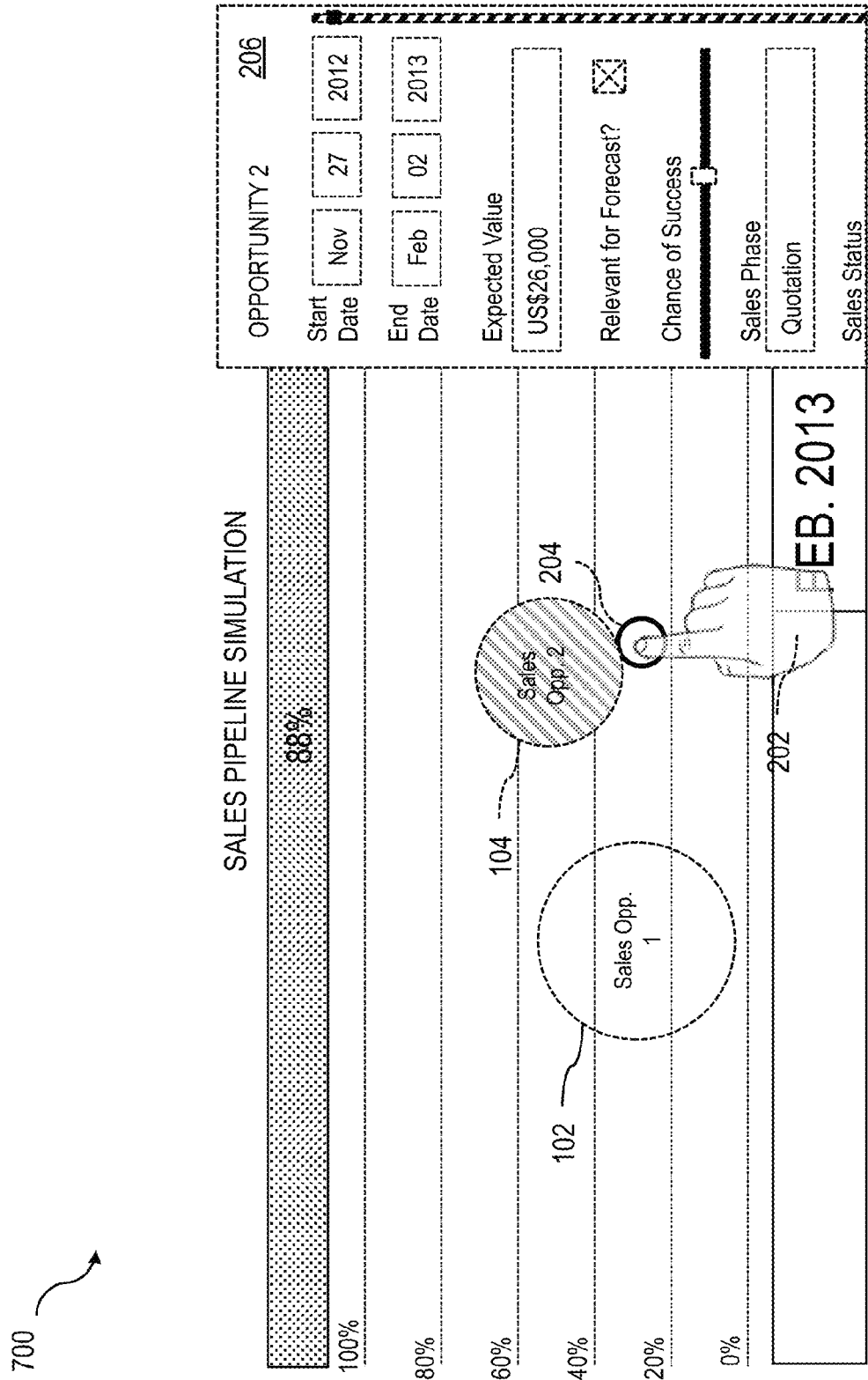
Figure 8:
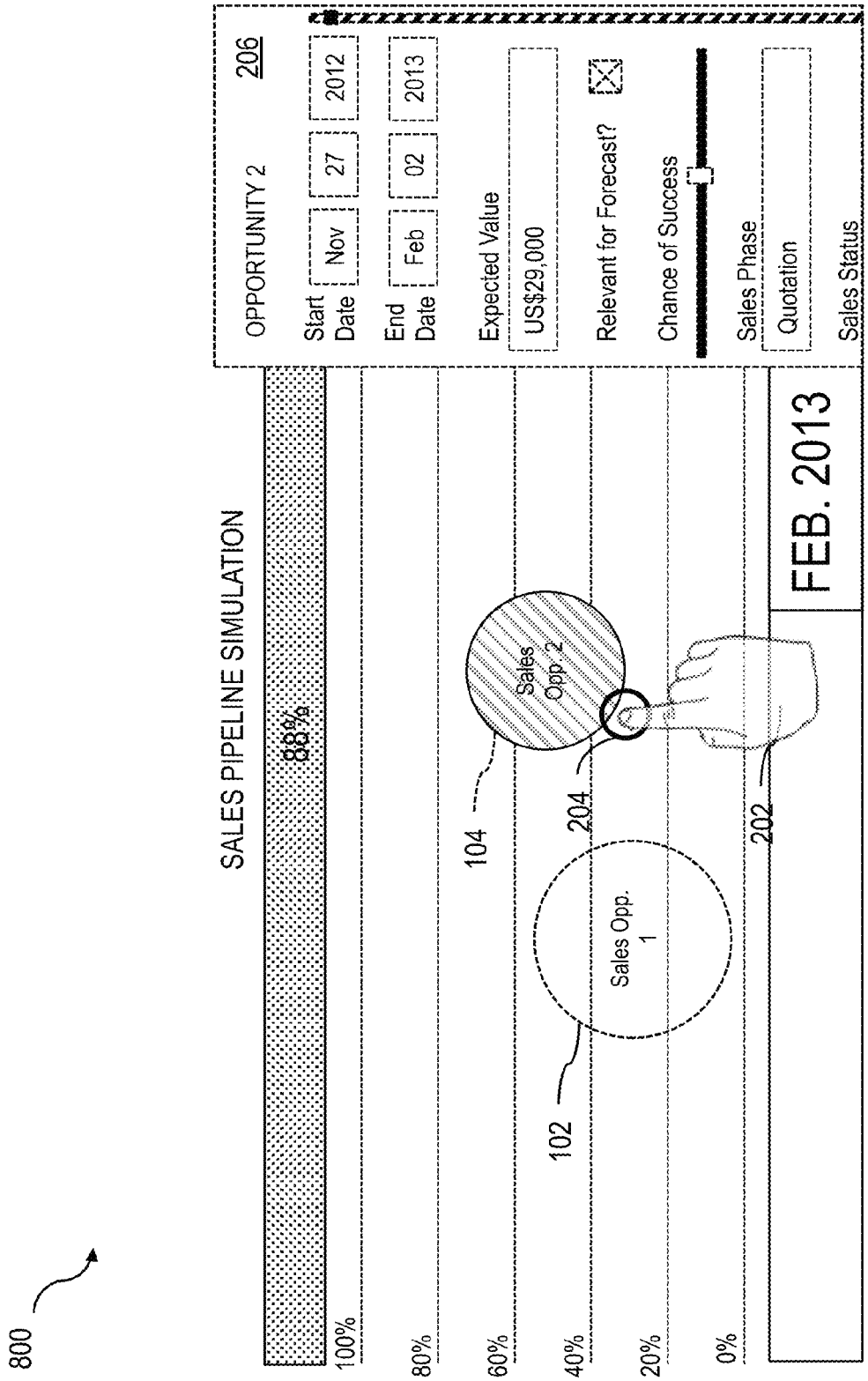
Figure 9:
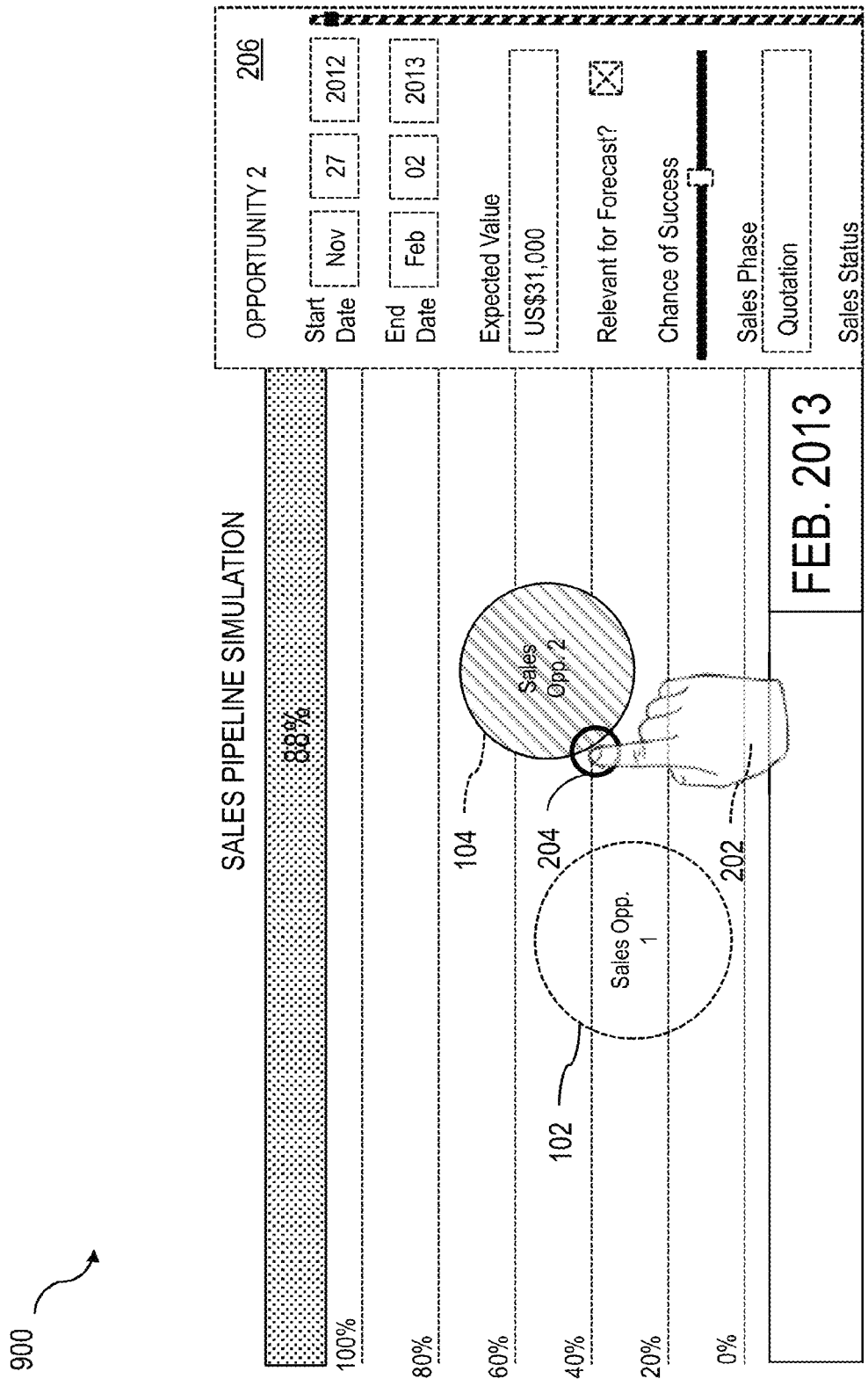
Figure 10:
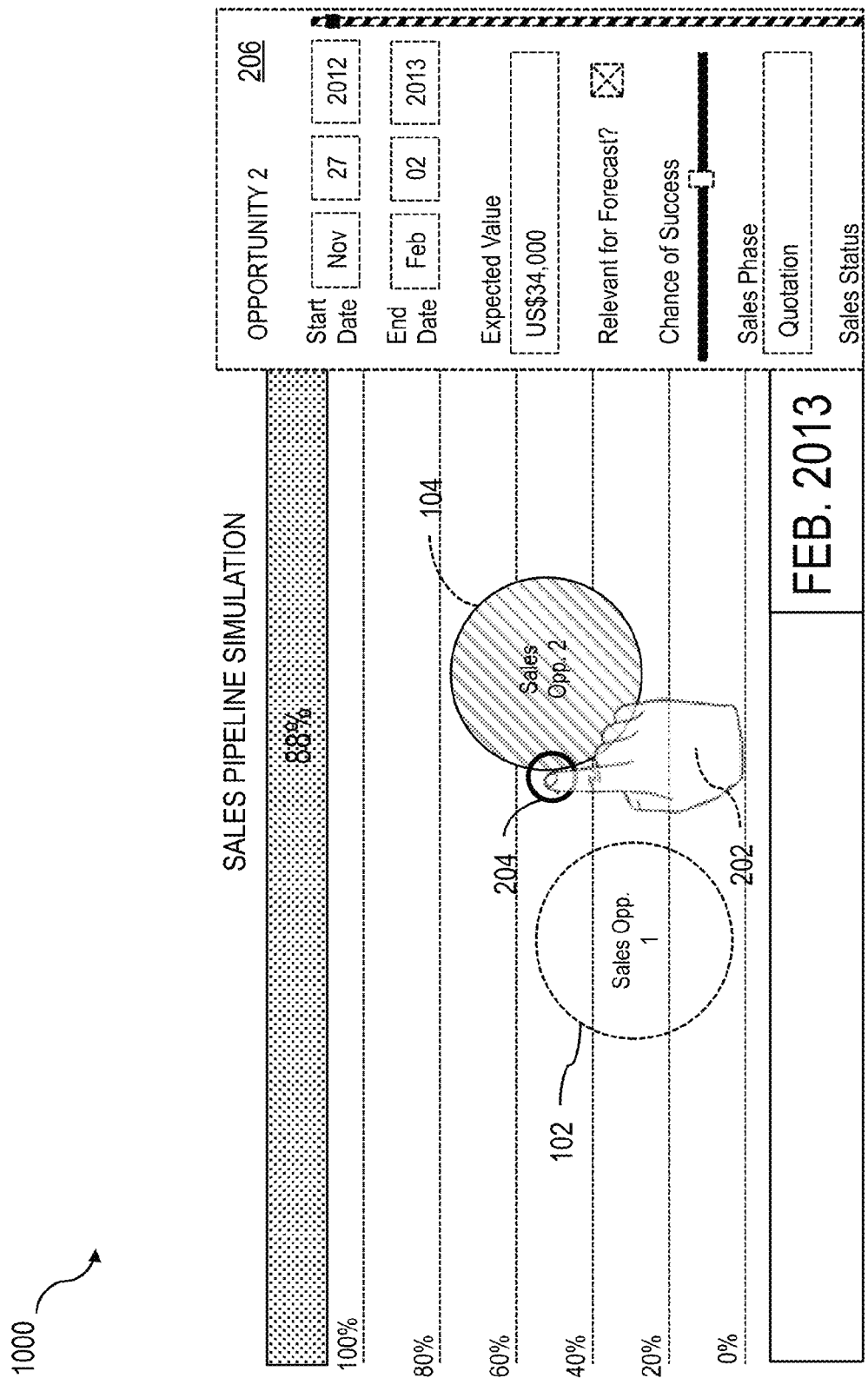
Figure 11:
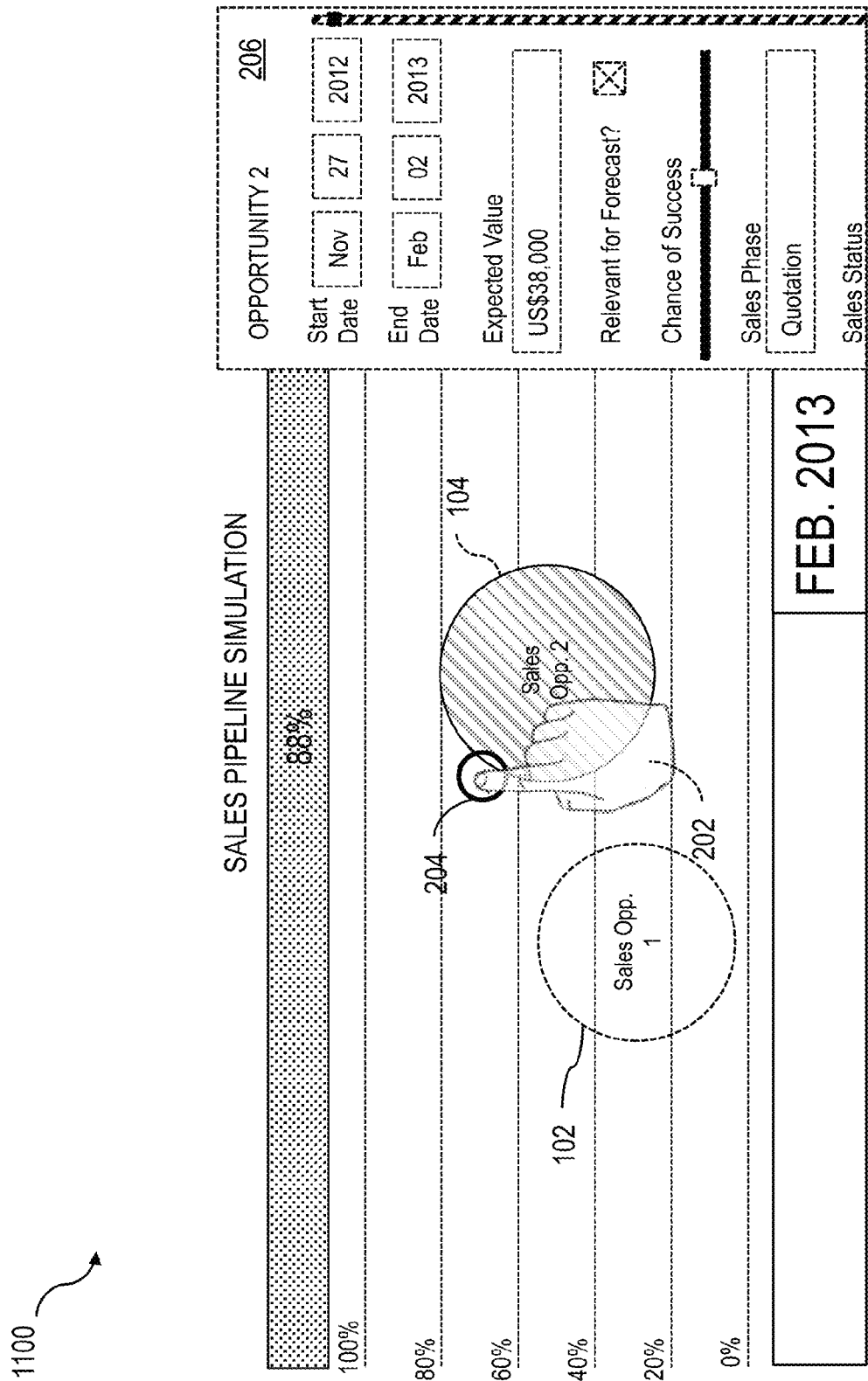
Figure 12:
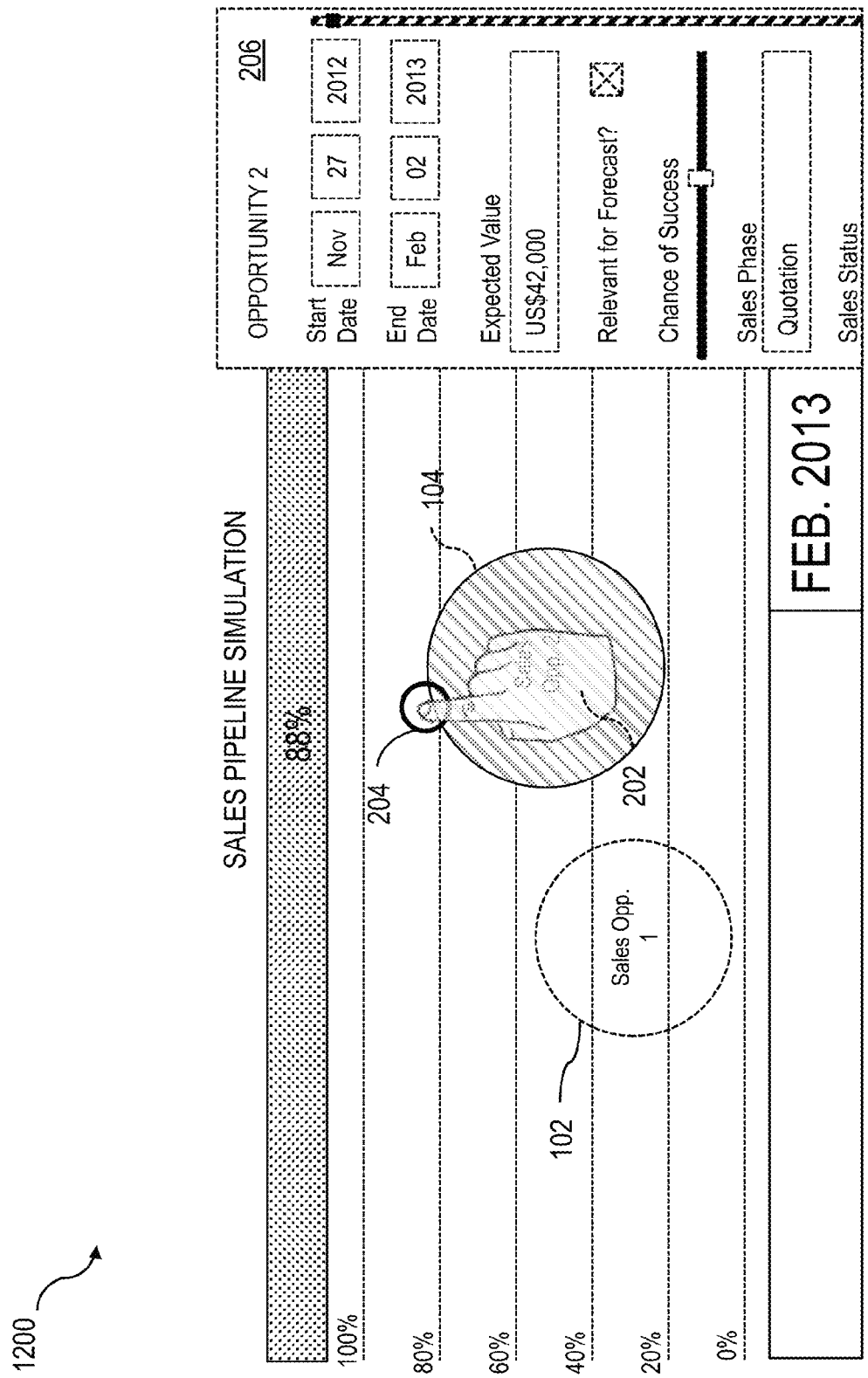
Figure 13:
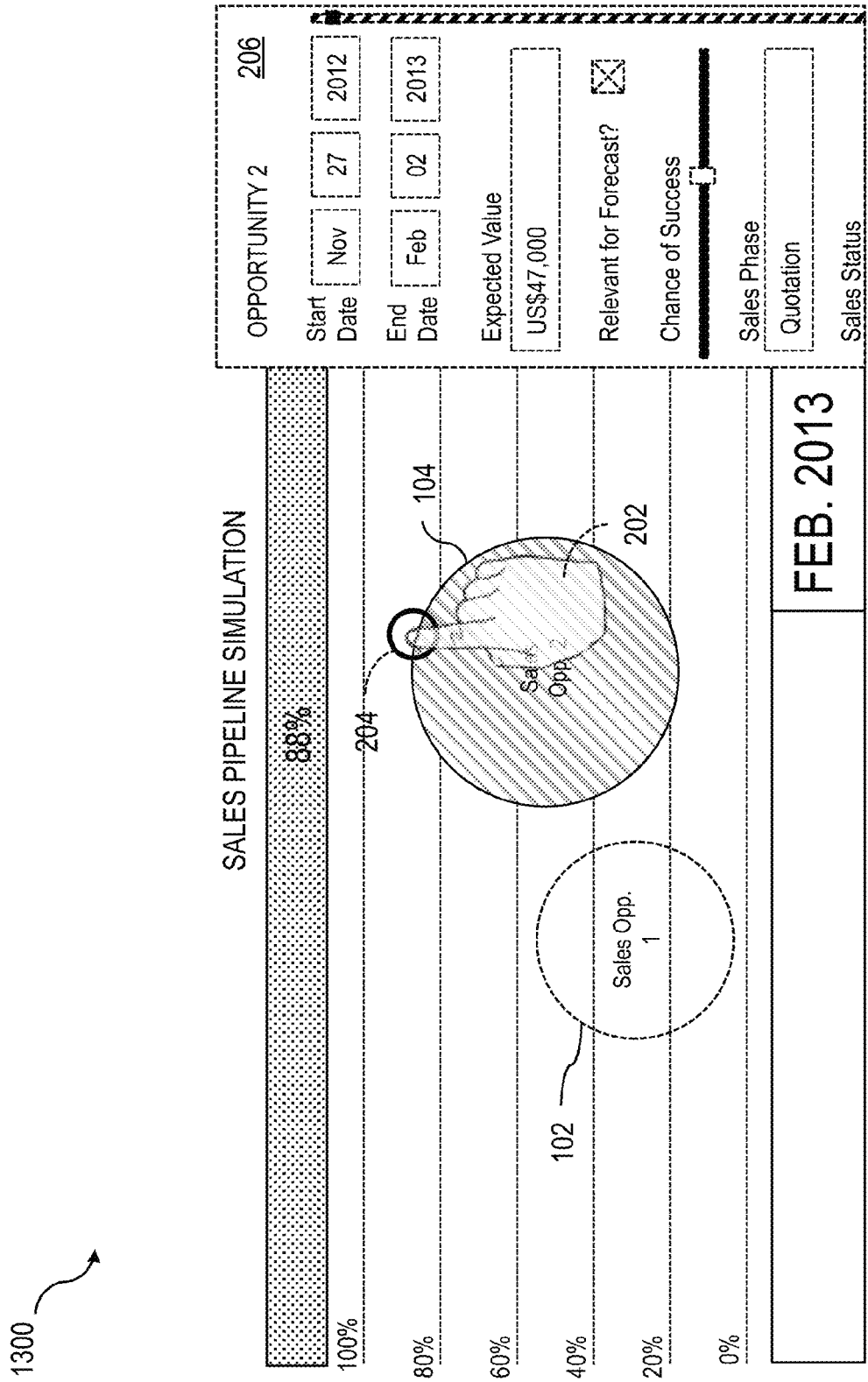
Figure 14:
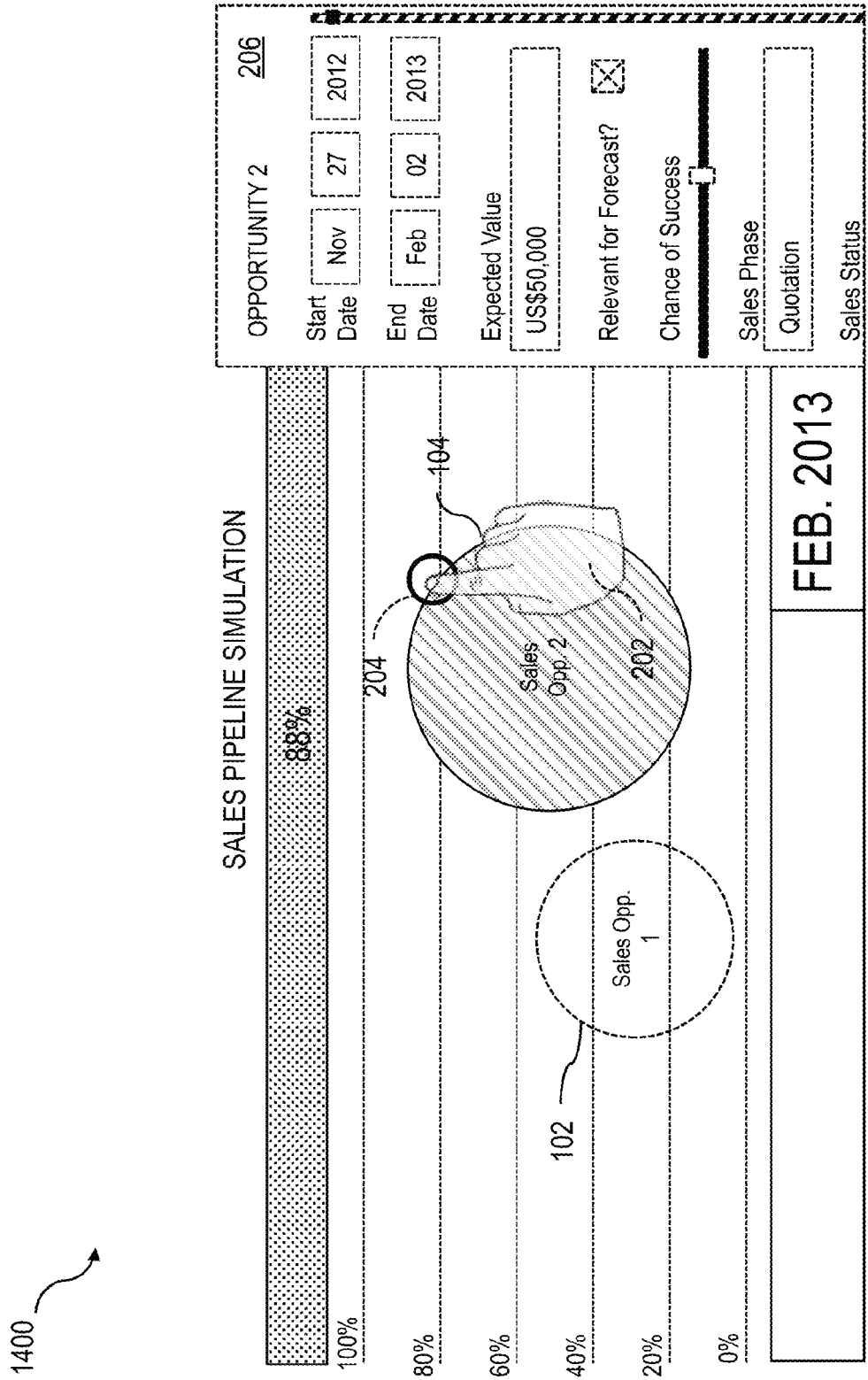

In the screenshot 100 of FIG. 1, two user interface elements 102, 104 are shown. The two user interface elements 102, 104 respectively represent a first sales opportunity and a second sales opportunity, each having a chance of success (represented by a position along a vertical axis), a date of expected completion of the opportunity (represented by a position along a horizontal axis), and an expected value of the opportunity (represented by a size of the user interface element). In the screenshot 200 of FIG. 2, a user provides a first user input that selects the second user interface element 104. In this example, the user interface is presented on a touch screen, and the first user input includes a touch of the screen area representing the second user interface element 104 by part of the user's hand 202 (e.g. a finger). The first user input causes display of a knob element 204 that is associated with the second user interface element 104. Also shown in FIG. 2 is a detail panel 206 that can optionally be displayed in response to selection of a user interface element by a first user input. In this example, the detail panel can include textual information such as a start and end date, an expected value, a chance of success, an indicator of a sales phase, etc. of the opportunity represented by the second user interface element 104. The second user interface element 104 can also optionally be highlighted or otherwise shown in a different manner than one or more other, non-selected user interface elements (e.g. first user interface element 102), which can also optionally be dimmed, grayed, or otherwise deemphasized.

As shown in the series of screenshots 300-1400 in FIG. 3 through FIG. 14, a second user input can be received associated with the knob element 204, and the second user input can cause motion of the knob element 204 in a rotational direction about the second user interface element 104. In this example, as the knob element 204 is moved in a clockwise direction, the second user interface element 104 increases in size. The changing size of the second user interface element 104 can optionally be reflected as a change in the expected value of the opportunity (e.g. in dollars) in the detail panel 206.

Figure 15:
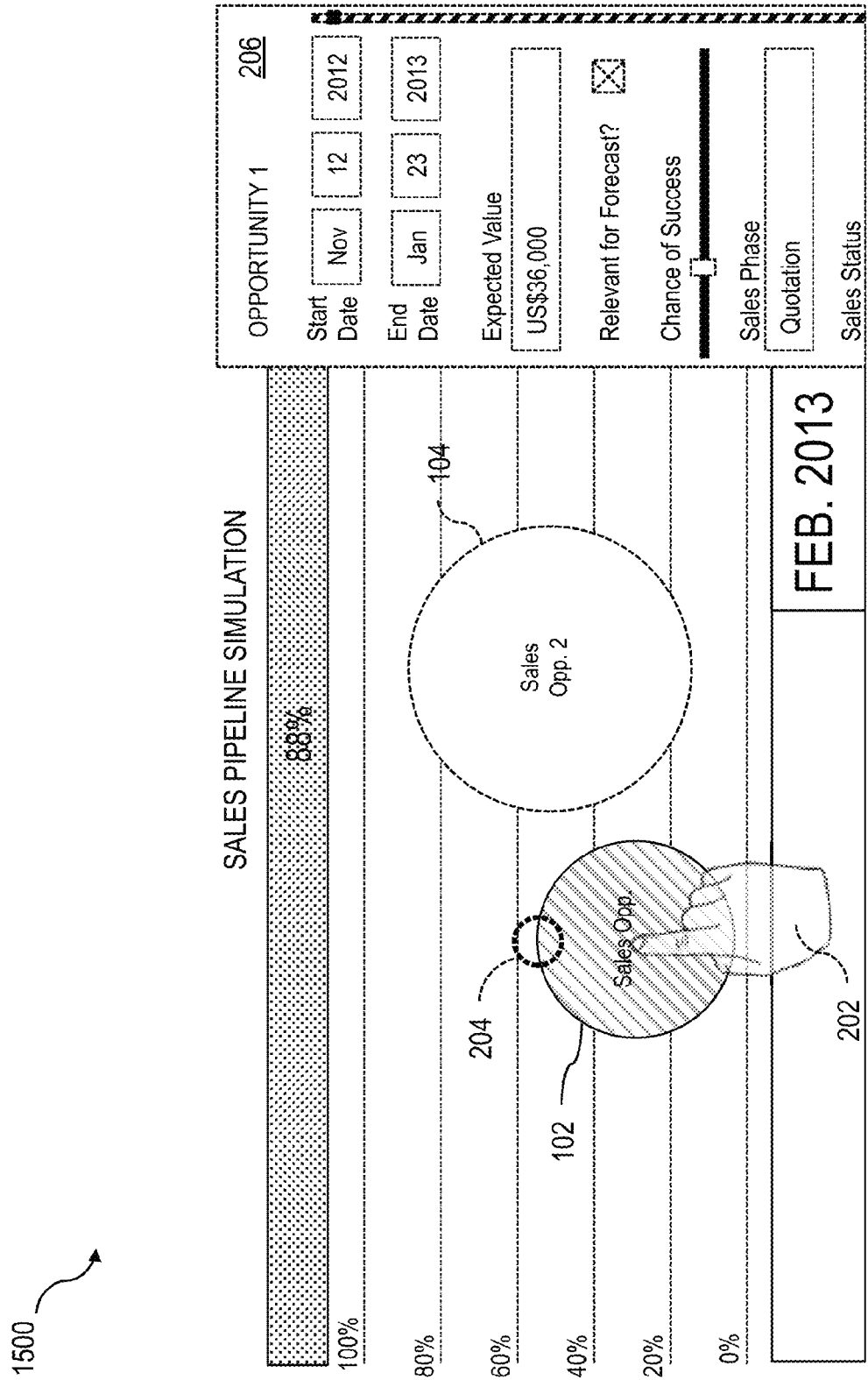
FIG. 15 through FIG. 19 show a series of screenshots of a user interface displaying features relating to decreasing a size of a user interface element consistent with implementations of the current subject matter.
Figure 16:
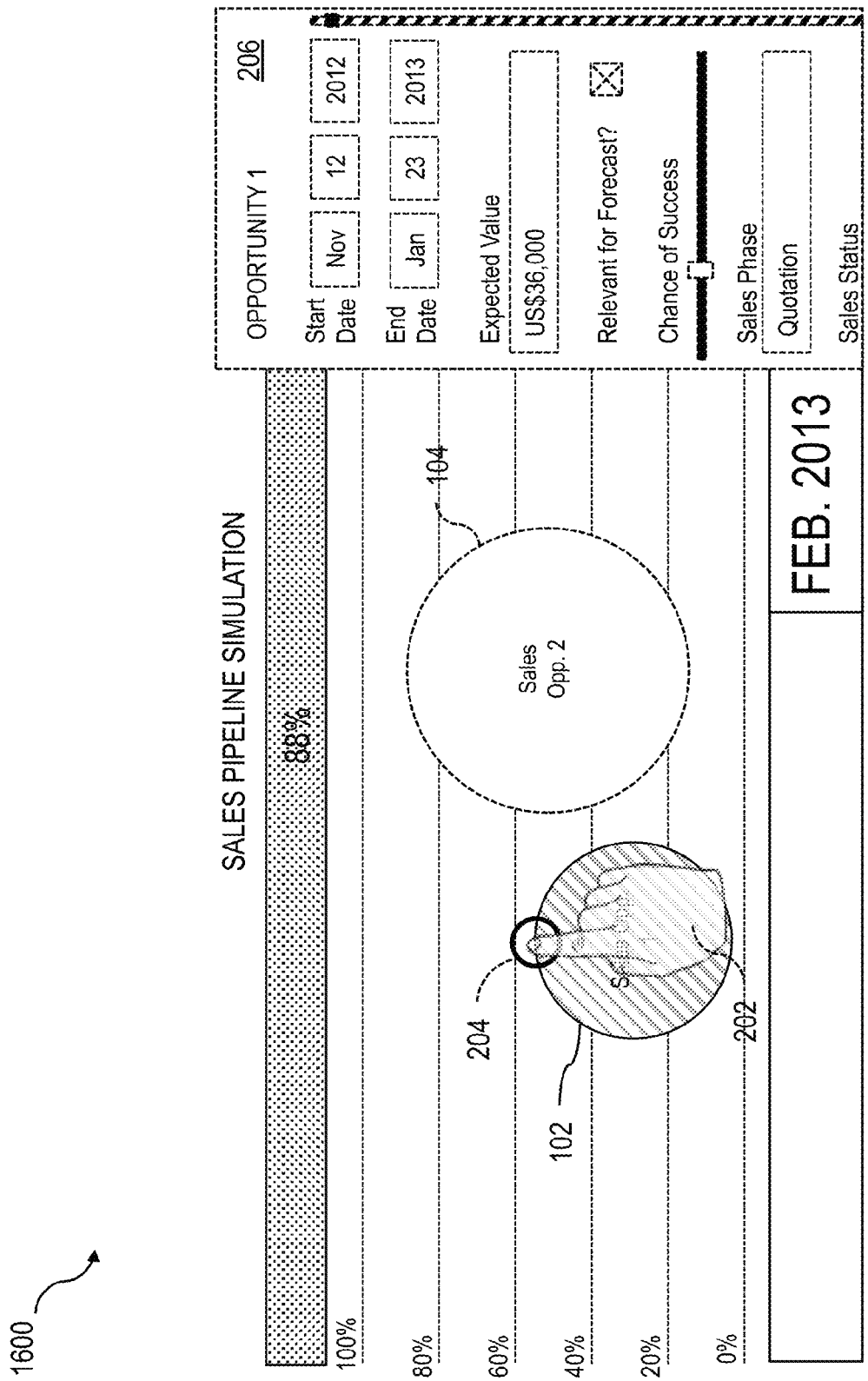
Figure 17:
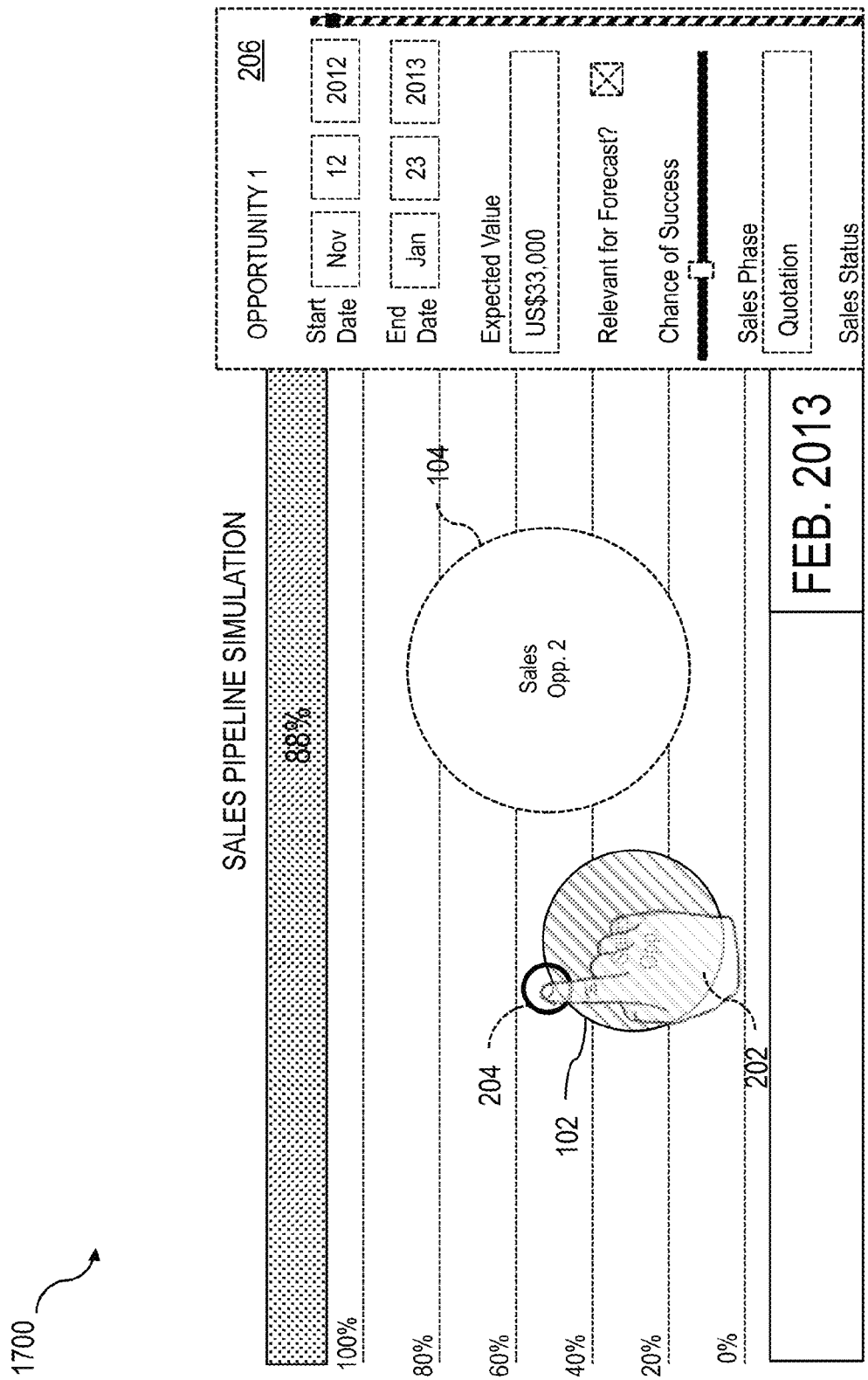
Figure 18:
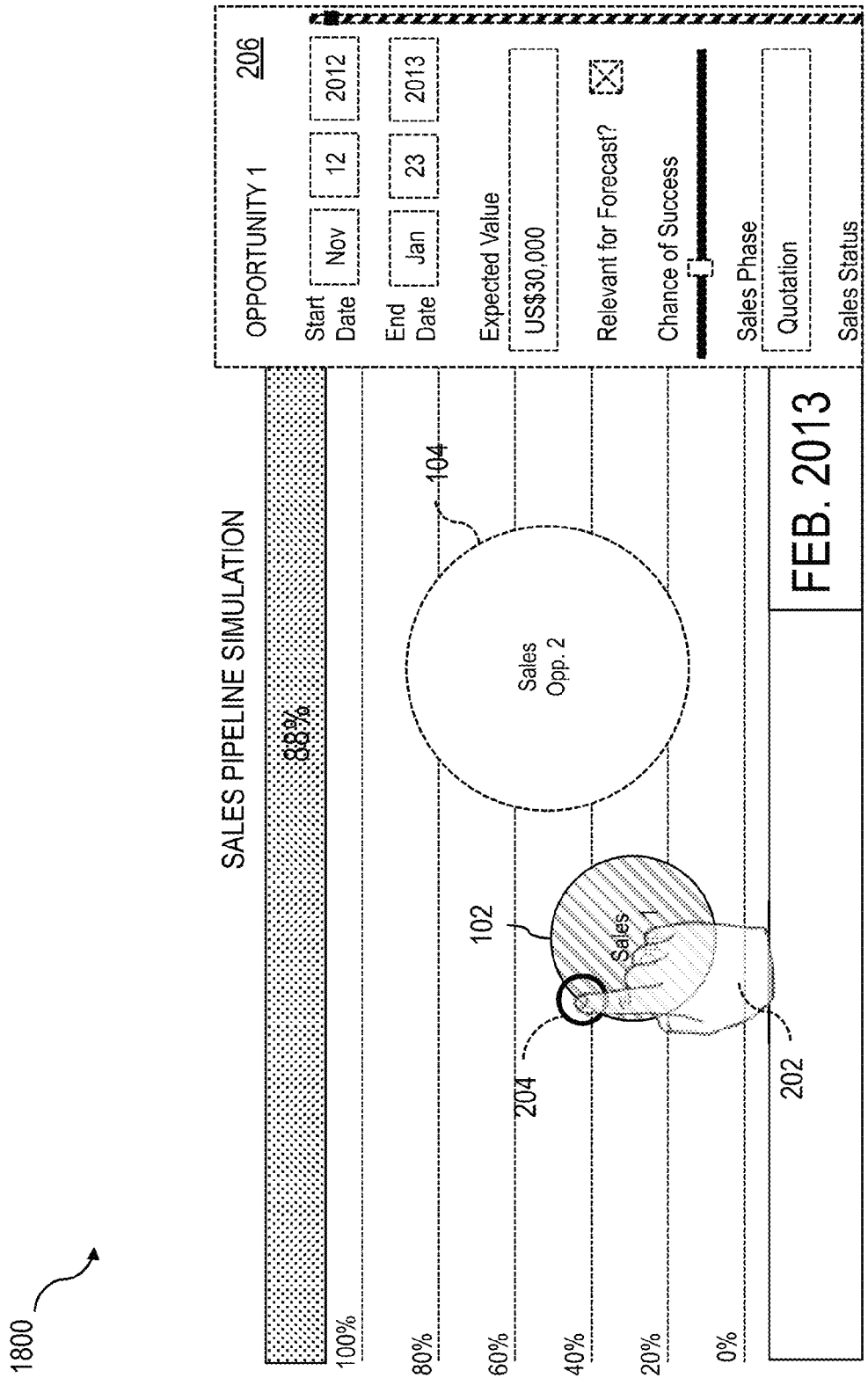
Figure 19:
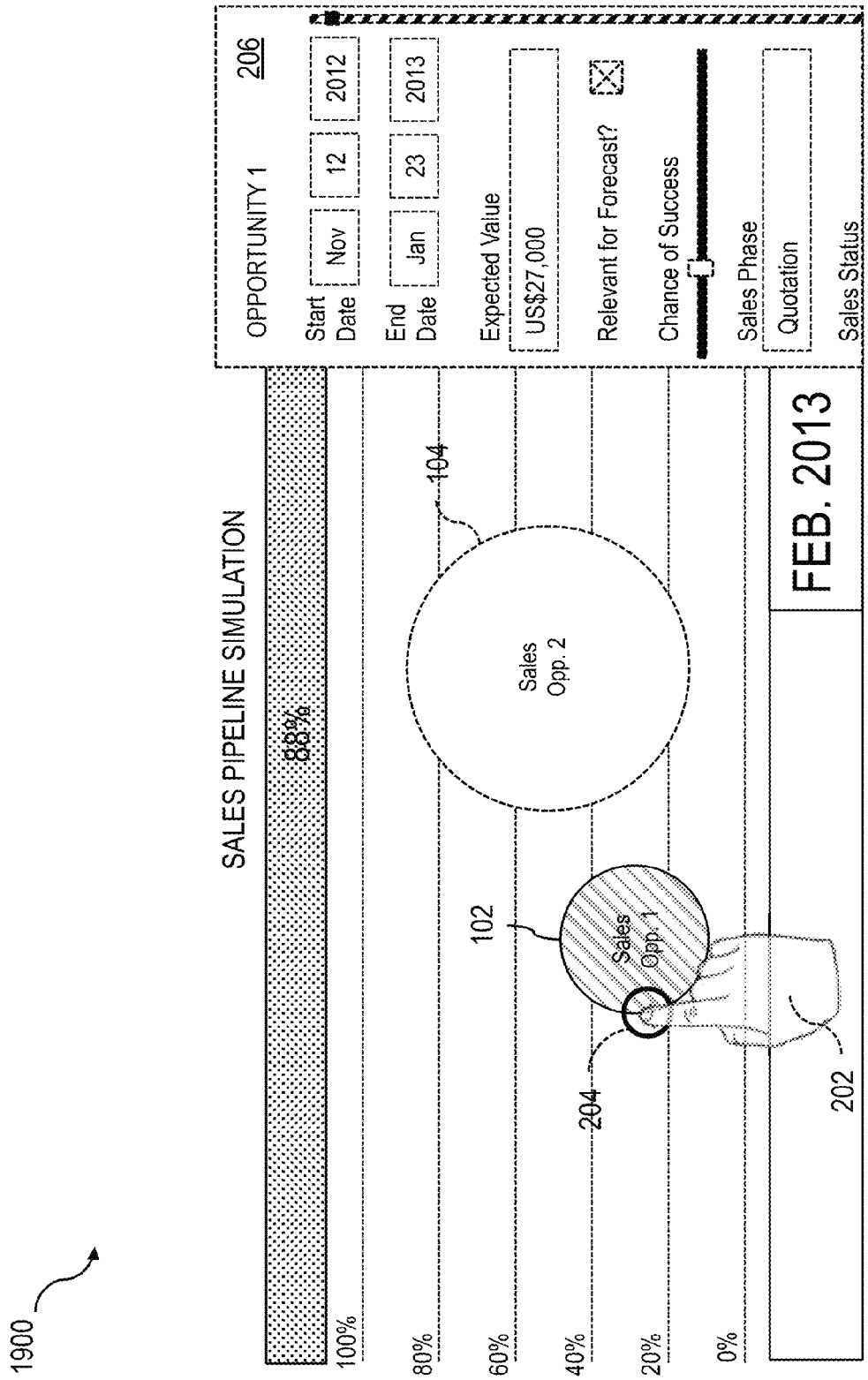

In the screenshot 1500 of FIG. 15, a user provides a new first user input that selects the first user interface element 102. The new first user input causes display of the knob element 204, now associated with the first user interface element 102. The detail panel 206 can continue to be displayed, now including textual information such as a start and end date, an expected value, a chance of success, an indicator of a sales phase, etc. of the opportunity represented by the first user interface element 102. The first user interface element 102 can also optionally be highlighted or otherwise shown in a different manner than one or more other, non-selected user interface elements (e.g. second user interface element 104), which can also optionally be dimmed, grayed, or otherwise deemphasized.

As shown in the series of screenshots 1600-1900 in FIG. 16 through FIG. 19, a new second user input can be received associated with the knob element 204, and the new second user input can cause motion of the knob element 204 in a rotational direction about the first user interface element 102. In this example, as the knob element 204 is moved in a counter-clockwise direction, the first user interface element 102 decreases in size. The changing size of the first user interface element 102 can optionally be reflected as a change in the expected value of the opportunity (e.g. in dollars) in the detail panel 206.

While the part of the user hand 202, which is representative of a user input such as a touch on a touch screen; a held click or other selection using a mouse, trackpad, trackball or the like; etc., is shown in the sequences of FIG. 3 to FIG. 14 and of FIG. 15 to FIG. 19 as remaining in contact with the knob element 204, this is not a requirement of implementations of the current subject matter. Instead, after an initial activation of the knob element 204 by a second user input, the increasing/decreasing of the size of the respective second/first user interface element 104/102 can continue even if contact is lost between the location of the second user input and the knob element 204. In other words, as long as the second user input is maintained (e.g. by continuous contact of a finger or stylus or the like with the touch screen, a held click or the like of a mouse or mouse-like input device, a held keyboard input, or the like), motion of the knob element 204 in a manner that can be interpreted as rotational about the currently selected user interface element 102, 104 can cause an increase or decrease in the size of the selected user interface element 102, 104 even if the touch of the touch screen or pointer or cursor controlled by an input device does not remain in contact with the knob element 204.

As described herein, when a user manipulates the knob element 204 in a rotational motion, for example in a circular or approximately circular motion around the selected user interface element, the selected user interface element changes in size. In one example, a clockwise motion of the knob element 204 causes the selected element to increase in size while a counter clockwise motion of the knob element 204 causes the selected element to decrease in size. In another example, clockwise motion can cause a decrease in size of the selected element while a counter clockwise motion can cause an increase in size of the selected element. The amount of size change experienced by the selected user interface element can in some implementations of the current subject matter be at least approximately directly proportional to the amount of rotational motion. For example, a given fractional or percentage change in a size of the selected user interface element can be caused by a set amount of rotational motion (e.g. a given number of radians or degrees of rotation) of the knob element 204.

In other implementations of the current subject matter, a given fractional or percentage change in the size of the selected user interface element can be caused by a variable amount of rotational motion. The variable amount of rotation that causes the given fractional or percentage change in the size of the selected user interface element can optionally be based on one or more algorithms using as input one or more of a current size of the selected user interface element, a speed of motion of the knob element 204, an additional input received (e.g. one or more keyboard strokes or other inputs, a secondary mouse click, an activation or other manipulation of an additional screen control, etc.), or the like. For example, in some implementations, the fractional or percentage change in the size of the selected user interface element per amount of rotational motion of the knob element 204 can be greater for a larger selected user interface element than for a smaller selected user interface element. The converse can alternatively be true in some implementations of the current subject matter. In still other implementations, the speed with which the user causes the knob element 204 to move can be determinative of the fractional or percentage change in the size of the selected user interface element per amount of rotational motion of the knob element 204.

Consistent with implementations of the current subject matter, the knob element 204 can be displayed upon detection of selection of a user interface element via a user input. The user input to select the user interface element can be any one of a variety of user inputs available for selection of a user interface element. For example, if the computing system includes a touch screen interface, the user input can be a tap or touch within a boundary of the user interface element. If a mouse, touchpad, trackball, or other device for moving a cursor, pointer, etc. on a screen is used, the user input to select the user interface element can include a click or other activation of such a device while the cursor, pointer, etc. is on or within a boundary of the user interface element. In an example, the knob element 204 can be displayed in response to such a detection of the user interface element. A second user input can activate the sizing action caused by motion of the knob element 204. For example, a first user input (e.g. a click or touch or the like) on or within a boundary of the user interface element can cause display of the knob element 204 and a second user input (e.g. a click or touch or the like) on or within a boundary of the knob element 204 can initiate its use for change a size of the selected user interface element.

The second user input can advantageously include an action that is maintained during movement of the knob element 204. For example, once the knob element 204 is activated by selection of the user interface element, as long as the second user input remains continuous (e.g. a touch is maintained with a touch screen; a click of a device such as a mouse, trackpad, trackball, etc. is held; or the like).

Sizing action can remain active even if a user's finger or other touch selection device does not remain on or within the knob element 204 as it moves on a touch screen as long as the finger or other touch selection device maintains contact with the touch screen. Similarly, in an implementation in which a touch pad, mouse, trackpad, or the like is used to manipulate the position of a pointer on a non-touch screen interface, the pointer need not remain on or within the knob element 204 provided a continuous selection is maintained (e.g. a held click on a mouse, trackball, trackpad, etc.; one or more held keyboard keys in association with a movement of a mouse, trackball, trackpad, etc.; or the like. Contact by a pointer or screen touch with the knob element 204 can, for example be required only to begin the rotational motion. After the motion has begun, the re-sizing control can remain active until contact with the screen or active control of the pointer stops.

As rotational motion of the knob element 204 begins under influence of the user input device, the size of the selected element can be directly changed. The knob element 204 can move about the selected object, but as noted above, the user input from the user input device need not remain within or on the area of the knob element 204. To allow precise and continuous control over the size of the selected element the amount of change in the size of the selected element per unit of rotational motion can vary depending on current size of the selected element. For example, a given unit of rotational motion can cause a larger absolute or percentage change in the size of a first selected element than the same given unit of rotational motion causes in a second selected element when the second selected element is smaller than the first selected element. Said another way, a larger first selected element can require a smaller angle of motion of the selector knob to achieve a same absolute or percentage change as a larger angle of rotation of the selector knob for a smaller second selected element.

To further facilitate fine control of the size of a currently selected user interface element 102, 104, a resulting change in size of the currently selected user interface can be indicated graphically and optionally also via a detail view, tooltip, or the like, such as for example as shown in FIG. 1 through FIG. 19. A user can be allowed to enter a specific value indicative of one or more dimensions of the currently selected user interface element via this type of additional element.

It should be noted that, while knob elements or similar user interface controls have been used previously in graphical user interfaces, for example to control properties such as sound volume, screen brightness, rotation of an object, and the like, such applications have not included an ability to dynamically, smoothly, and accurately manipulate a size of a selected object. Rather, such previous uses of a knob element in a user interface have effectively synthesized functionality of a physical knob or control.

Figure 20:
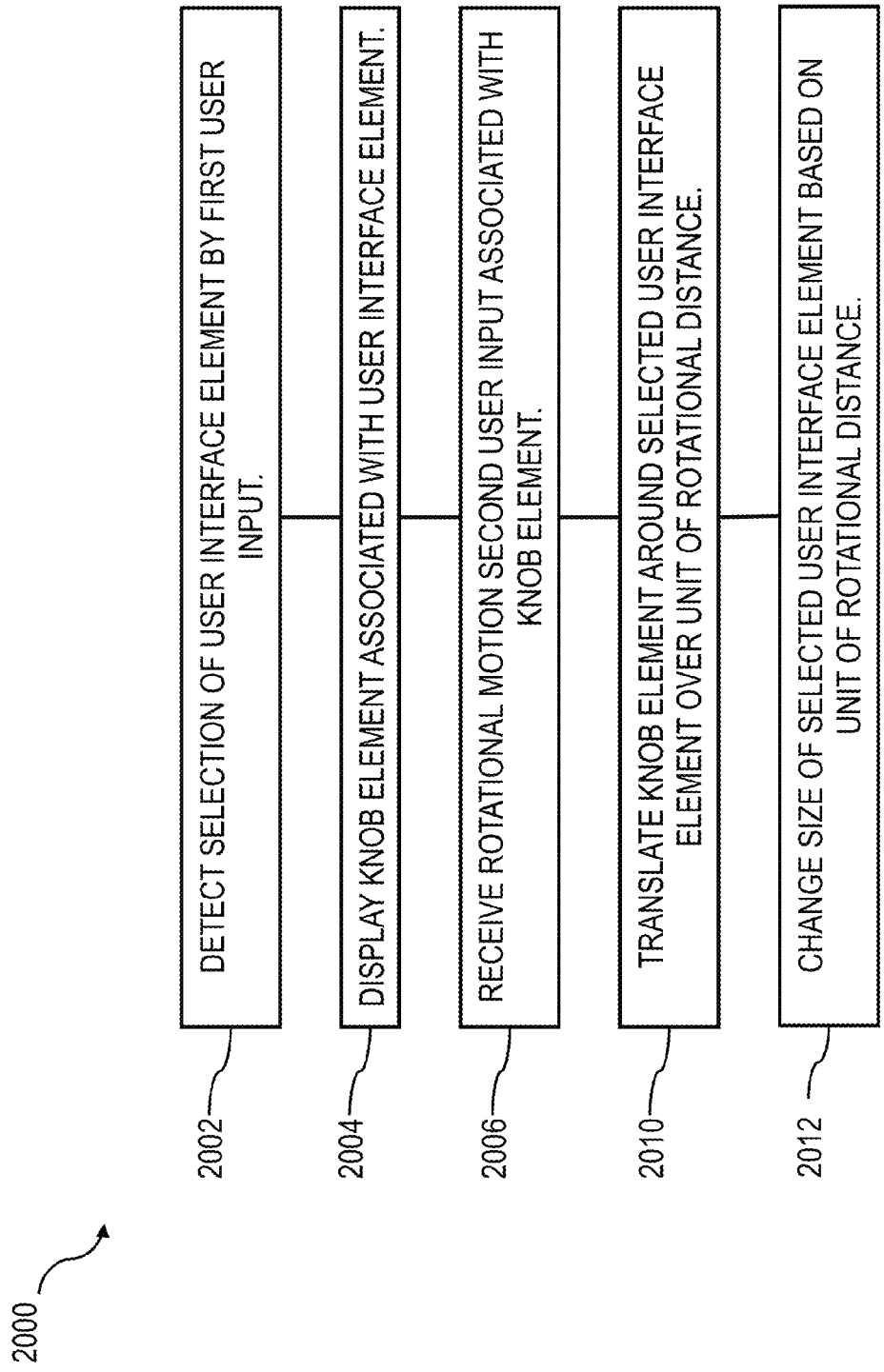
FIG. 20 is a process flow diagram illustrating aspects of a method having one or more features consistent with implementations of the current subject matter.

FIG. 20 shows a process flow diagram illustrating features of a method, at least some of which can optionally be included in implementations of the current subject matter. At 2002, a selection of a user interface element can be detected. The user interface element selection can occur via a first user input, such as for example as discussed above. At 2004, a knob element associated with the selected user interface element can be displayed. The knob element can be a size control knob element having one or more features or functions as described herein. A second user input can be received at 2006. This second user input can include a rotational motion associated with the knob element. At 2010, the knob element can be translated around the selected user interface element over a unit of rotational distance, and at 2012, the size of the selected user interface element can be changed in response to the based on unit of rotational distance.

Figure 21:
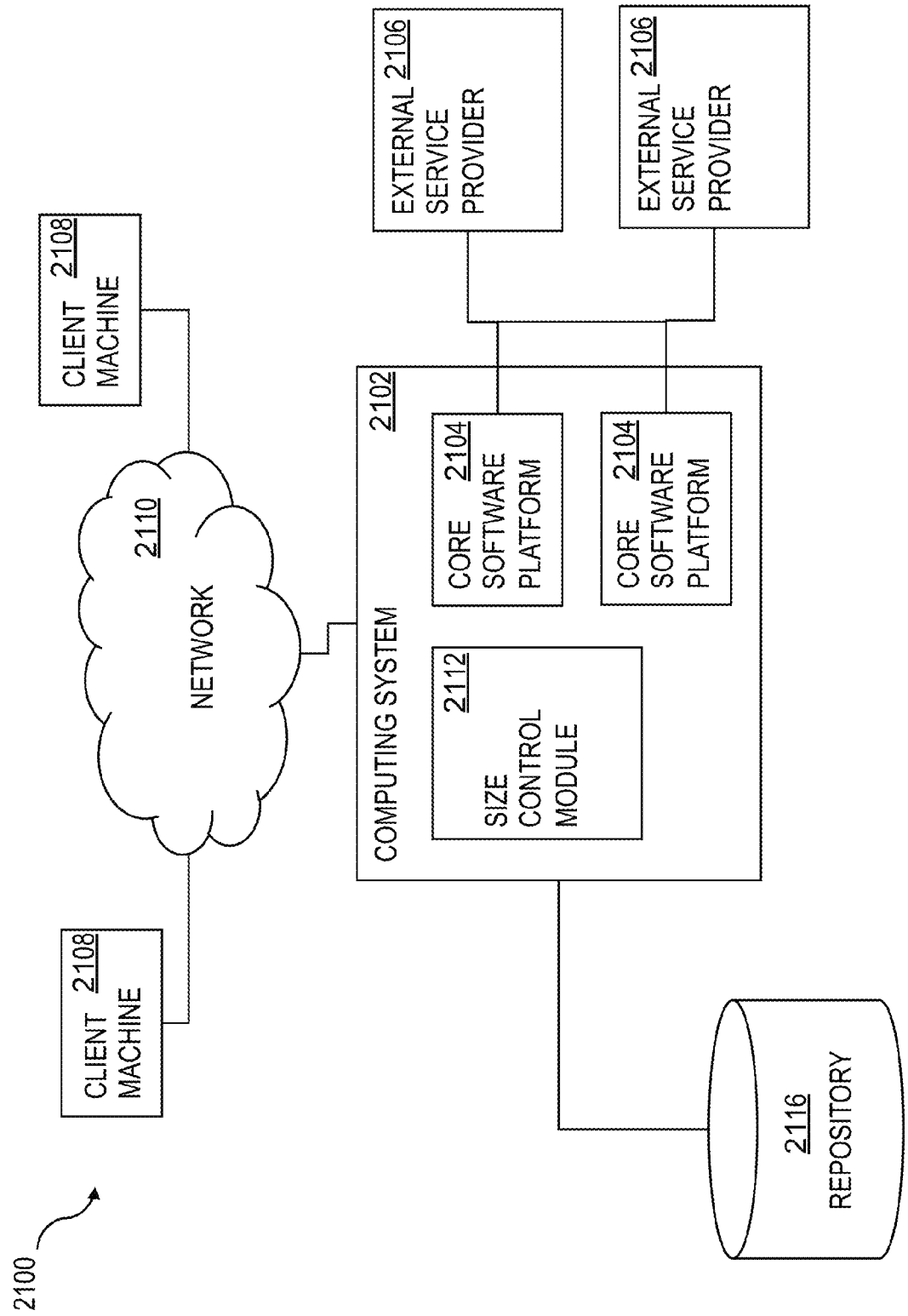
FIG. 21 is a diagram illustrating aspects of a system including features consistent with implementations of the current subject matter.

FIG. 21 shows a diagram of a system consistent with implementations of the current subject matter. A computing system 2102, which can include one or more programmable processors and can optionally be a distributed computing system with multiple parallel systems across which processing loads are distributed, can execute functions of one or more core software platform modules 2104 providing one or more features of a business or other software architecture. The computing system 2102 can optionally also aggregate or otherwise provide a gateway via which users can access functionality provided by one or more external service providers 2106. Client machines 2108, which can be computers, smart phones, tablet devices, or any other computing device, can access the computing system 2102, either via a direct connection, a local terminal, or over a network 2110 (e.g. a local area network, a wide area network, a wireless network, the Internet, or the like). A user interface element sizing module 2112 can be hosted on the computing system 2102 or alternatively, on an external system accessible over a network connection. The user interface element sizing module 2112 can optionally include one or more discrete software and/or hardware modules that perform operations such as those described herein. Alternatively, one or more of the client machines 2108 can execute a module, application, other software functionality that provides one or more features similar to those described herein.

In some implementations of the current subject matter, the computing system 102 can access one or more metadata repositories and/or other data repositories 2116 (e.g. process repositories, scenarios repositories, transactional data repositories, etc.) that can store definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some examples, the definition can optionally be stored as a business object. In some implementations, the business object can include a template definition of a standard business process. The template definition that can optionally be modified via one or more extensions that are stored in the one or more metadata repositories 2116.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory computer-readable storage medium storing one or more programs, the one or more programs comprising instructions that, when executed by at least one programmable processor, cause the at least one programmable processor to perform operations comprising:
    detecting a selection, occurring via a first user input, of a user interface element within a graphical user interface, the user interface element comprising a size of the user interface element being linked to a value displayed in the graphical user interface, the value representing a quantity other than the size or geometric properties of the user interface element;
    displaying, in the graphical user interface, a knob element associated with the user interface element;
    receiving a rotational motion second user input associated with the knob element; translating the knob element around the selected user interface element over a unit of rotational distance at an angular speed, the translating occurring in response to the received rotational motion second user input; and
    changing the size of the selected user interface element by a given fraction or percentage per unit of rotational distance, wherein the given fraction or percentage is proportional to both the angular speed and the current size of the selected user interface element.

2. A computer program product as in claim 1, wherein the changing of the size of the selected user interface element comprises an increase in the size when the unit of rotational distance is in a clockwise direction around the selected user interface element and a decrease in the size when the unit of rotational distance is in a counter-clockwise direction around the selected user interface element.

3. The computer program product of claim 1, wherein the user interface element and the knob element are within a first panel of the graphical user interface, wherein the value is displayed in a second panel of the graphical user interface, and wherein the value displayed within the second panel is in response to the change in size of the selected user interface element.

4. The computer program product of claim 1 wherein the given fraction or percentage is directly proportional to both the angular speed and the current size of the selected user interface element.

5. The computer program product of claim 1 wherein the given fraction or percentage is inversely proportional to both the angular speed and the current size of the selected user interface element.

6. A system comprising:
   at least one programmable processor; and
   a machine-readable medium storing instructions that, when executed by the at least one processor, cause the at least one programmable processor to perform operations comprising:
   detecting a selection of a user interface element within a graphical user interface, the selection occurring via a first user input;
   displaying, in the graphical user interface, a knob element associated with the user interface element;
   receiving a rotational motion second user input associated with the knob element;
   translating the knob element around the selected user interface element over a unit of rotational distance at an angular speed, the translating occurring in response to the received rotational motion second user input; and
   changing the size of the selected user interface element by a given fraction or percentage per unit of rotational distance, wherein the given fraction or percentage is proportional to both the angular speed and the current size of the selected user interface element.

7. A system as in claim 6, wherein the changing of the size of the selected user interface element comprises an increase in the size when the unit of rotational distance is in a clockwise direction around the selected user interface element and a decrease in the size when the unit of rotational distance is in a counter-clockwise direction around the selected user interface element.

8. The system of claim 6 wherein the given fraction or percentage is directly proportional to both the angular speed and the current size of the selected user interface element.

9. The system of claim 6 wherein the given fraction or percentage is inversely proportional to both the angular speed and the current size of the selected user interface element.

10. A computer-implemented method comprising:
    detecting a selection of a user interface element within a graphical user interface, the selection occurring via a first user input;
    displaying, in the graphical user interface, a knob element associated with the user interface element;
    receiving a rotational motion second user input associated with the knob element;
    translating the knob element around the selected user interface element over a unit of rotational distance at an angular speed, the translating occurring in response to the received rotational motion second user input; and
    changing the size of the selected user interface element by a given fraction or percentage per unit of rotational distance, wherein the given fraction or percentage is proportional to both the angular speed and the current size of the selected user interface element.

11. A computer-implemented method as in claim 10, wherein the changing of the size of the selected user interface element comprises an increase in the size when the unit of rotational distance is in a clockwise direction around the selected user interface element and a decrease in the size when the unit of rotational distance is in a counter-clockwise direction around the selected user interface element.

12. A computer-implemented method as in claim 10, wherein at least one of the detecting, the displaying, the receiving, the translating, and the changing are performed by a system comprising at least one programmable processor.

13. The computer-implemented method of claim 10 wherein the given fraction or percentage is directly proportional to both the angular speed and the current size of the selected user interface element.

14. The computer-implemented method of claim 10 wherein the given fraction or percentage is inversely proportional to both the angular speed and the current size of the selected user interface element.

* * * * *